United States Patent
Gilmore et al.

(12) 
(10) Patent No.: US 6,484,862 B1
(45) Date of Patent: Nov. 26, 2002

(54) EXTENDABLE GRAVITY LOADER

(75) Inventors: Phillip J. Gilmore, Healdsburg, CA (US); John I. McCort, Rocklin, CA (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 09/618,689

(22) Filed: Jul. 18, 2000

(51) Int. Cl.$^7$ ................................................ B65G 13/00
(52) U.S. Cl. .................. 193/35 TE; 414/397; 414/398; 198/592; 198/594
(58) Field of Search ................................ 414/397, 398; 193/35 TE; 198/592, 594

(56) References Cited

U.S. PATENT DOCUMENTS

| | | | |
|---|---|---|---|
| 2,287,230 A | 6/1942 | Cartlidge | 198/592 |
| 2,558,629 A | 6/1951 | Smida | 198/89 |
| 2,812,867 A | 11/1957 | Anderson | 198/592 |
| 2,971,631 A | 2/1961 | Gray | 198/592 |
| 3,504,782 A | 4/1970 | Slagle et al. | 198/592 |
| 3,581,874 A | 6/1971 | Keith | 198/121 |

(List continued on next page.)

FOREIGN PATENT DOCUMENTS

| | | |
|---|---|---|
| DE | 1481347 | 7/1969 |
| DE | 1946195 | 3/1971 |
| FR | 1361570 | 12/1964 |
| FR | 2525570 | 10/1983 |
| GB | 891147 | 3/1962 |
| GB | 2200613 A | 8/1988 |

OTHER PUBLICATIONS

Copy of Proposal No. 20038, dated Jul. 15, 1999, entire proposal, with sensitive information redacted.

(List continued on next page.)

Primary Examiner—Stephen T. Gordon
Assistant Examiner—Lori L Coletta
(74) Attorney, Agent, or Firm—Van Dyke, Gardner, Linn & Burkhart, LLP

(57) ABSTRACT

An extendable gravity loader includes an extendable gravity propelled conveying surface and a user interface section having a driven conveying surface. The sidewalls of the conveyor define an upper edge which is above a conveying surface of the loader to prevent packages from being laterally dislodged therefrom. The sidewalls allow for a minimal height of the extendable units, while still providing a structurally robust loader with a minimal drop off between conveying surfaces of the respective units. The user interface section provided at an outer end of the loader may have at least a portion that is vertically adjustable via an actuator at the extendable unit of the loader. The actuator may be mounted to the gravity loader at a pair of compression springs, which function to absorb shock to the actuator when packages or the like are dropped or otherwise impact the user interface section. Additionally, a limit switch may be provided to deactivate the actuator in response to detection of resistance to upward and downward movement of the user interface section. An actuator assist device, such as gas springs or the like, is operable to assist the actuator in raising and lowering the user interface section, such that a lower vertical height of the user interface section may be provided, since a smaller lift arm or moment arm is necessary to raise and lower the user interface section by the actuator.

68 Claims, 10 Drawing Sheets

U.S. PATENT DOCUMENTS

| | | | | |
|---|---|---|---|---|
| 3,596,785 A | | 8/1971 | Weatherford, Jr. | 214/89 |
| 3,651,963 A | | 3/1972 | McWilliams | 214/6 G |
| 3,717,263 A | | 2/1973 | McWilliams | 214/6 G |
| 3,752,296 A | | 8/1973 | Peterson | 198/592 |
| 3,819,068 A | | 6/1974 | Weir | 214/38 C |
| 3,827,585 A | | 8/1974 | McWilliams | 214/41 |
| 3,835,980 A | | 9/1974 | Brooks, Jr. | 198/139 |
| 3,866,768 A | | 2/1975 | Weir | 198/592 |
| 3,885,682 A | | 5/1975 | McWilliams | 214/6 G |
| 3,931,897 A | | 1/1976 | Bacon et al. | 214/6 G |
| 3,982,625 A | | 9/1976 | Wentz et al. | 198/572 |
| 3,993,204 A | | 11/1976 | Hummel | 214/89 |
| 4,281,955 A | | 8/1981 | McWilliams | 414/398 |
| 4,425,069 A | | 1/1984 | Saur et al. | 414/398 |
| 4,813,526 A | | 3/1989 | Bélanger | 198/313 |
| 4,832,559 A | * | 5/1989 | Gebbardt | 414/398 |
| 4,924,993 A | | 5/1990 | Buxton | 193/311 |
| 5,009,560 A | | 4/1991 | Ruder et al. | 414/392 |
| 5,186,596 A | * | 2/1993 | Boucher et al. | 414/398 |
| 5,351,809 A | | 10/1994 | Gilmore et al. | 198/812 |
| 5,403,142 A | | 4/1995 | Stewart | 414/392 |
| 5,423,413 A | | 6/1995 | Gilmore | 198/594 |
| 5,487,462 A | | 1/1996 | Gilmore | 198/594 |
| 5,568,857 A | | 10/1996 | Chen et al. | 198/592 |
| 5,642,803 A | | 7/1997 | Tanaka | 198/535 |
| 5,685,416 A | * | 11/1997 | Bonnet | 414/398 |
| 5,718,325 A | * | 2/1998 | Doster et al. | 193/35 TE |
| 5,902,089 A | * | 5/1999 | Sinn et al. | 414/398 |
| 6,003,658 A | * | 12/1999 | Best et al. | 193/35 TE |
| 6,006,893 A | | 12/1999 | Gilmore et al. | 198/588 |

OTHER PUBLICATIONS

Copy of activities pertaining to a Loader Mockup, including drawings believed to be discussed on Nov. 12, 1998, internal memos dated Nov. 25, 1998, Dec. 7, 1998, Dec. 13, 1998, Dec. 15, 1998, Dec. 17, 1998 and Dec. 29, 1998, and a copy of Order No. L249094, dated Dec. 14, 1998, for the Gravity Loader Mockup, with sensitive information redacted from the memos and order.

Product brochure entitled "Expand–O–Conveyor," published in 1953 by Oliver Farquhar Conveyors.

Product brochure entitled "Telescopic Belt Loader," published by Calijan, date unknown.

Commonly assigned, copending U.S. patent application Ser. No. 09/474,700, filed on Dec. 29, 1999, entitled Extendable Conveyor with Additional Boom Section.

Commonly assigned, copending U.S. patent application Ser. No. 09/386,196, filed Aug. 30, 1999 entitled Extendable Trailer Loader/Unloader with User Interface Section.

Commonly assigned, copending U.S. patent application, Ser. No. 09/543,456, filed Apr. 5, 2000 by Gilmore et al. and entitled Extendable Trailer Loader/Unloader with User Interface Section.

* cited by examiner

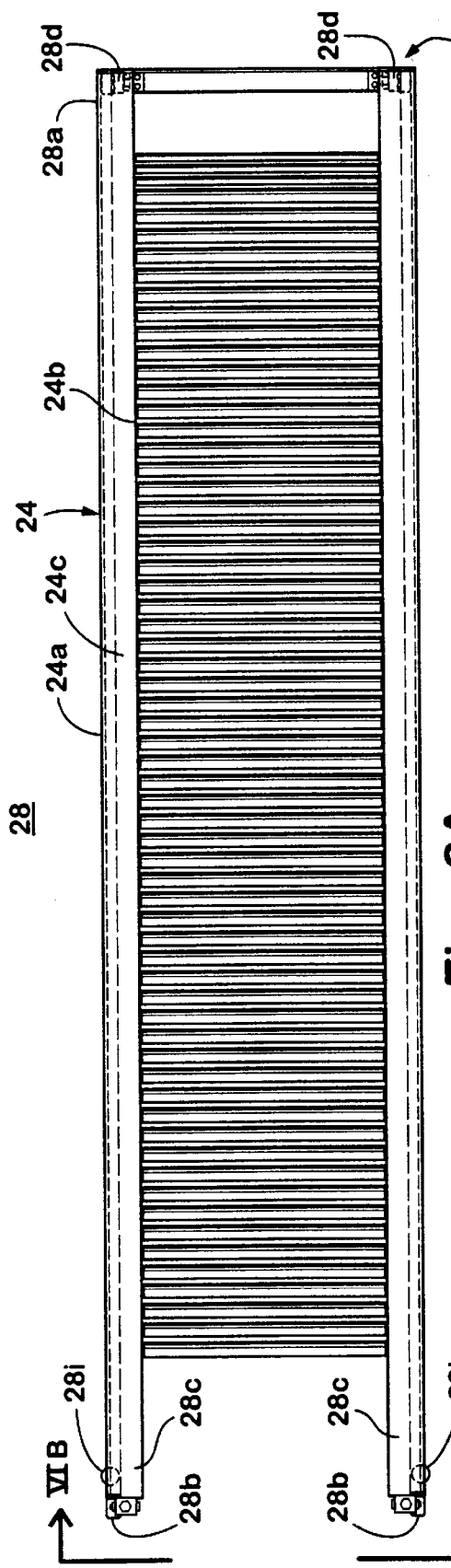
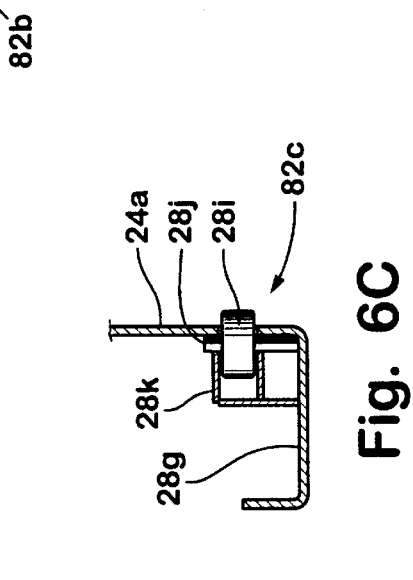
Fig. 6C
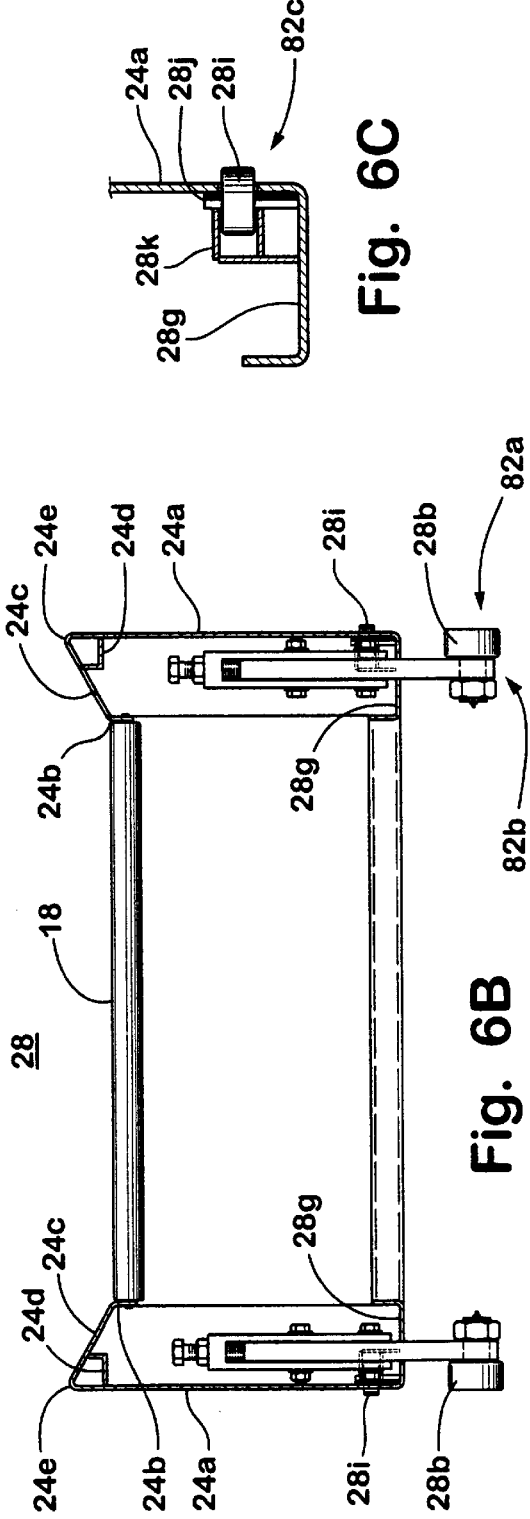
Fig. 6A
Fig. 6B

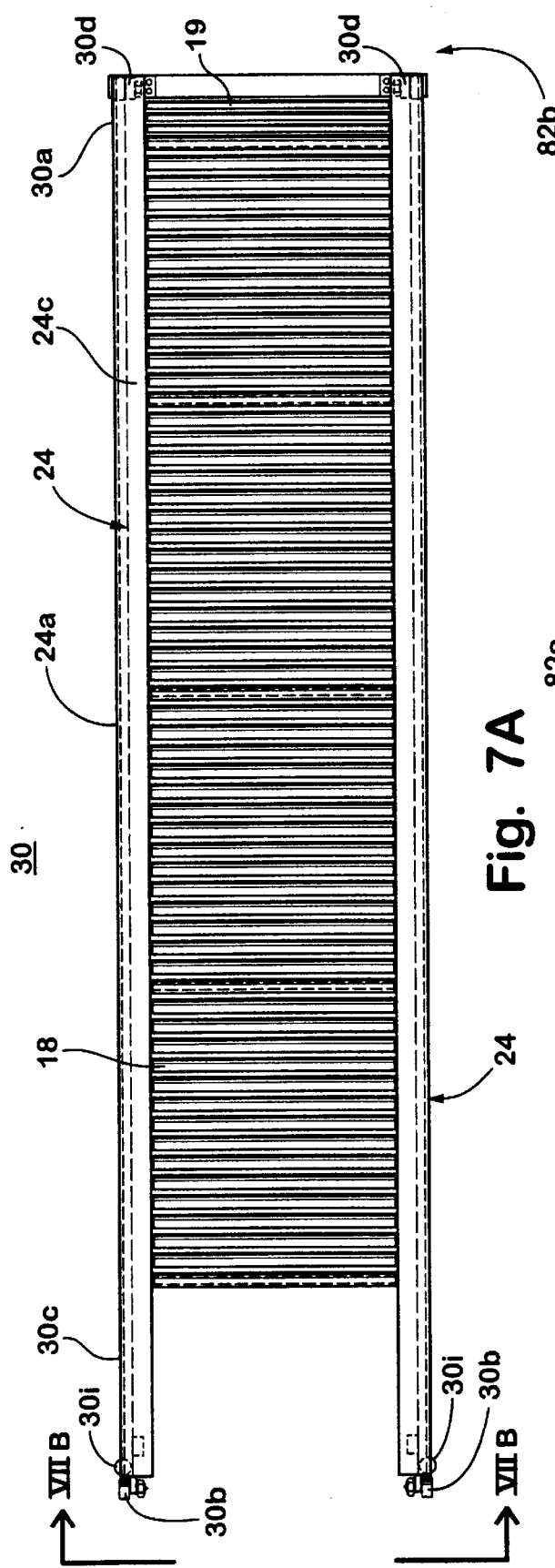
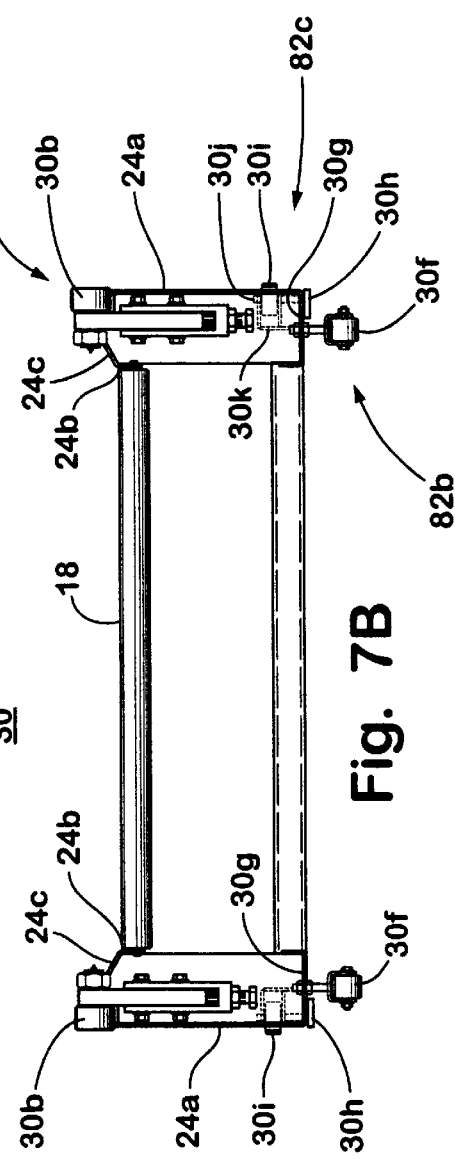
Fig. 7A
Fig. 7B

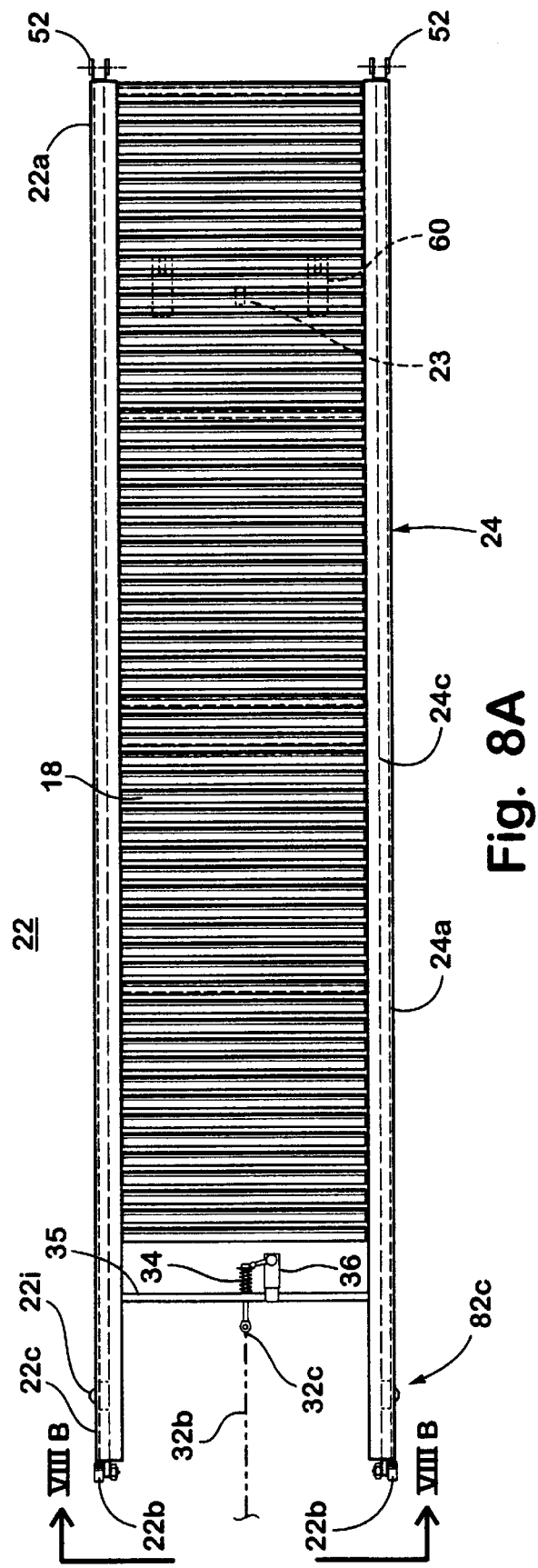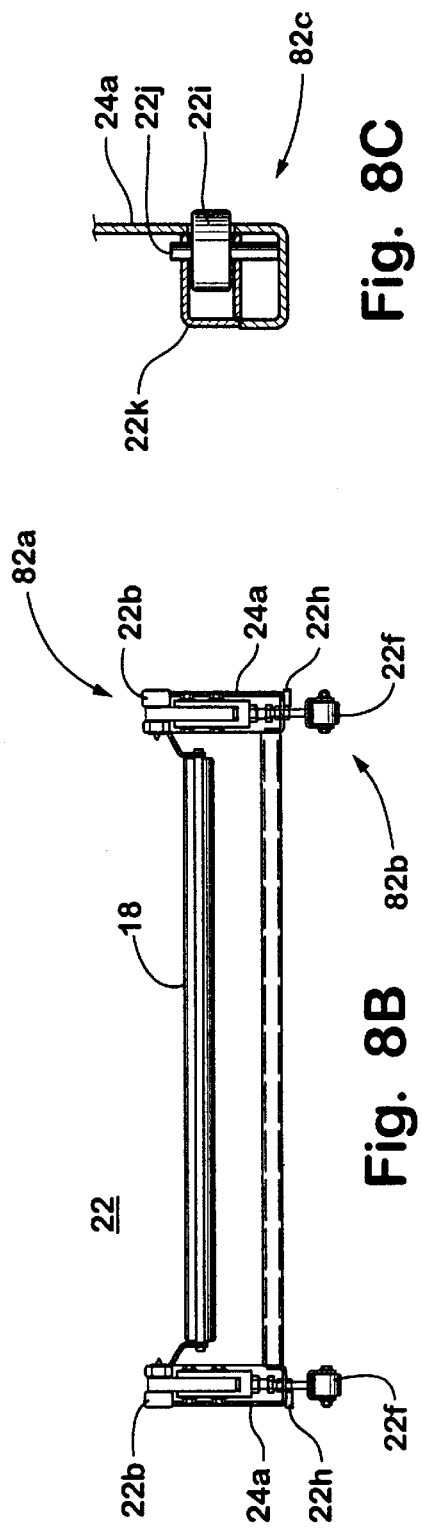
Fig. 8A
Fig. 8B
Fig. 8C

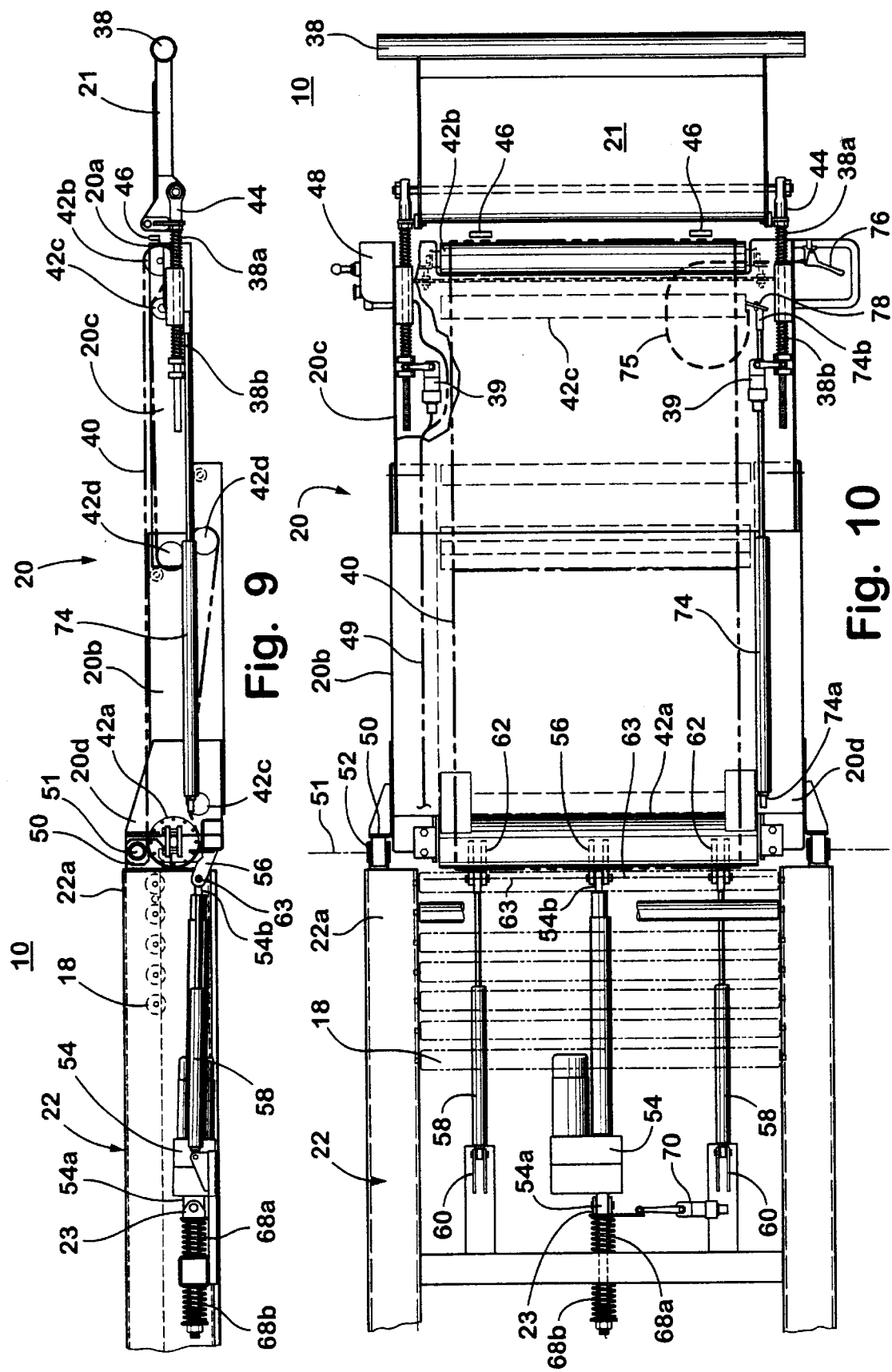

EXTENDABLE GRAVITY LOADER

BACKGROUND OF THE INVENTION

The present invention relates generally to gravity loaders for loading packages and the like, such as into a truck/trailer, and more particularly, to a cantilevered telescopingly extendable gravity loader.

Gravity loaders are often implemented at loading docks for trucks, trailers or the like. The gravity loaders are extendable into a truck/trailer and angled downward such that gravitational forces cause packages to move down the loaders along a plurality of rollers. The gravity loaders may be extendable to reach further into the trailer, in order to minimize the manual lifting and carrying of the packages, and retractable to a stored position to minimize the space taken up by the loader when not in use. However, because of the substantial size and weight of these loaders, extension and retraction is often accomplished by powered extension and retraction systems, which are typically complicated and expensive devices.

Also, the rollers of the loader are typically along an upper edge of the sidewalls of the loader. As multiple packages travel down the loader, a backlog of packages may pile up at the outer end before the operator may remove the packages from the loader and position the packages within the truck trailer. Because the rollers are positioned along the upper edge of the sidewalls, the pile up of packages may result in one or more packages being pushed off the loader.

Additionally, because gravity loaders are angled to provide a slope for the packages to travel down along, the discharge end of the conveyor may be positioned low and near the ground. A worker has to bend over to pick up the packages to move them to an appropriate place in the truck. Such bending and lifting is difficult and may result in injury to the worker. In some cases, obstacles, such as packages, supports or the like, may be positioned along the floor of the truck trailer. There may not be sufficient clearance of the obstacles to provide a sufficient angle or slope of the loader to cause the packages to travel downwardly along the rollers of the loader under the action of gravity.

SUMMARY OF THE INVENTION

The present invention is intended to provide a cantilevered telescopic extendable gravity loader for loading packages into a truck trailer or the like. The gravity loader includes at least one section and is nested, such that the section or sections may be retracted into a base structure. A plurality of rollers of the loader may be positioned below an upper portion of the sidewalls of the loader, such that packages are not prone to be dislodged from the loader. A user interface section may be provided at a forward end of the loader to ease raising and lowering of the packages to a desired height before the packages are manually removed from the loader.

According to an aspect of the present invention, an extendable conveyor or loader includes a support structure and an extendable conveyor section supported in a cantilevered manner. The extendable conveyor section includes at least one extendable conveyor unit which is mechanically extendable between an extended position and a retracted position nested within the extendable conveyor section and support structure. The extendable conveyor units have an upper portion along opposite sides thereof. A plurality of rollers are supported at the extendable conveyor unit defining a gravity operator conveying surface. A user interface section is provided at a forward end of the extendable conveyor section. The user interface section includes a driven conveying surface, such as a belt conveyor or the like. In a preferred embodiment, the extendable conveyor units and the conveying surface are orientated at an angle with respect to horizontal which is between at least approximately 3° and at most approximately 5°.

According to another aspect of the present invention, the extendable conveyor sections have inverted generally U-shaped sides which include an outer sidewall, an inner sidewall and an upper portion. The extendable sections have a plurality of rollers mounted to the inner sidewalls and below the upper portion. Preferably, a cantilevered support roller is positioned at an upper portion of at least one extendable section and provides cantilevered support of the section via rolling engagement along the upper portion of the sidewalls of another, inwardly or rearwardly adjacent inner section.

According to yet another aspect of the present invention, the extendable conveyor section includes at least two conveyor units which are downwardly angled and extendable to an extended position via gravitational forces. At least one support roller is positioned between a rearwardly positioned section and a forwardly positioned section and provides rolling support of the forwardly positioned section as it is extended and retracted relative to the rearwardly positioned section. The support rollers are frictionally tuned such that the conveyor units extend forwardly at different speeds relative to one another, whereby extension of one unit relative to another varies in response to the frictional resistance of the corresponding support rollers. Preferably, the forwardly positioned conveyor unit extends at a slower pace than one or more rearwardly positioned units.

According to yet another aspect of the present invention, a user interface section is supported in a cantilevered manner from the extendable conveyor unit. The user interface section is vertically adjustable about a substantially horizontal axis via an actuator. The actuator is mounted to at least one elastic member at the conveyor unit. The elastic member is extendable and/or compressible in response to resistance to vertical movement of the user interface section being encountered as the actuator vertically adjusts the user interface section. A limit switch may be operable to deactivate the actuator in response to a threshold amount of extension or compression of the elastic member. Preferably, the elastic member comprises a pair of compression springs, whereby the first compression spring is compressible in response to resistance to downward movement of the user interface section and a second compression spring is compressible in response to resistance to upward movement of the user interface section.

According to still yet another aspect of the present invention, a user interface section is supported in a cantilevered manner from an extendable conveyor unit. The user interface section is vertically adjustable about a substantially horizontal axis via an actuator. A vertical assist device is operable to assist the actuator in vertically adjusting the user interface section. Preferably, the vertical assist device comprises a pair of gas springs positioned along the linear actuator.

The present invention provides a cantilevered extendable gravity loader which provides optimal extension rates and package travel rates, while providing clearance of obstacles within the truck trailer. Retraction of the extendable units is accomplished via a low cost retraction system comprising a winch and a cable. The extendable units are fully nested and provide raised sidewalls above the rollers to prevent packages from falling off the loader, while also providing a minimal drop off between the conveying surfaces of the units and a minimal height of the units. The actuator for the user interface section is preferably mounted within the extendable unit at one or more compression springs to protect the actuator from impact or shock. The lift assist devices assist the actuator in vertically adjusting the user interface section, such that a smaller moment arm is needed at the user interface section to raise and lower the section.

These and other objects, advantages, purposes and features of this invention will become apparent upon review of the following specification in conjunction with the drawings.

BRIEF DESCRIPTION OF THE DRAWINGS

FIG. 6A is a top plan view of a rearward extendable unit of the present invention;

FIG. 6B is a rear end view of the extendable unit of FIG. 6A;

FIG. 6C is an enlarged view of a side roller of the extendable unit of FIG. 6A;

FIG. 7A is a top plan view of a middle extendable unit of the present invention;

FIG. 7B is a rear end view of the extendable unit of FIG. 7A;

FIG. 8A is a top plan view of a forward extendable unit of the present invention;

FIG. 8B is a rear end view of the extendable unit of FIG. 8A;

FIG. 8C is an enlarged view of a side roller of the extendable unit of FIG. 8A;

FIG. 9 is a side elevation of a two stage user interface section pivotally mounted at a forward end of a conveyor section;

FIG. 10 is a top plan view of the user interface section of FIG. 9;

DESCRIPTION OF THE PREFERRED EMBODIMENTS

Figure 1:
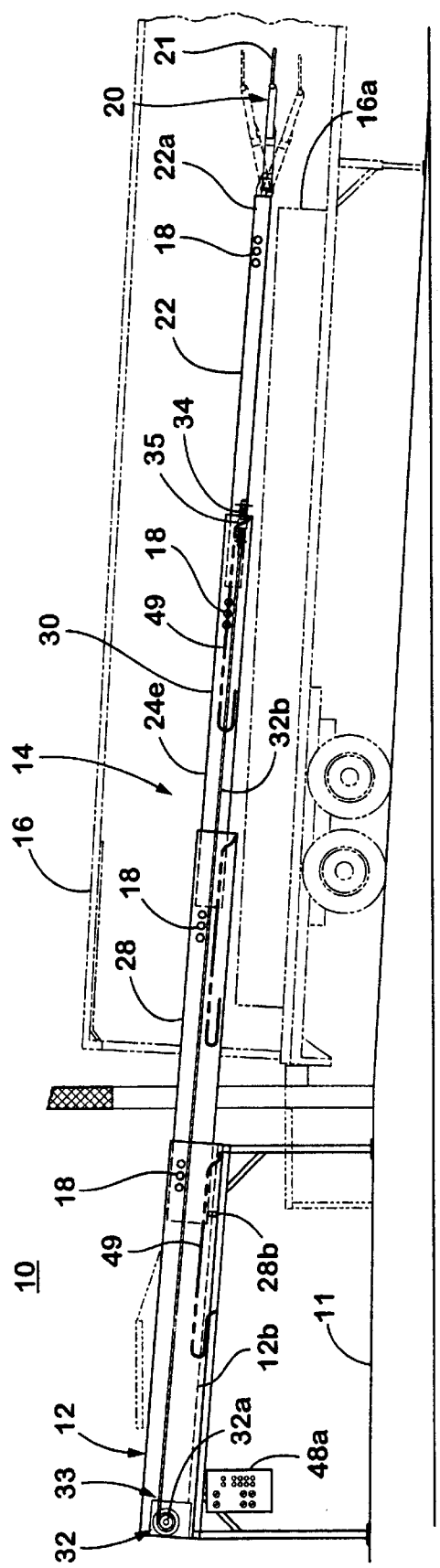
FIG. 1 is a side elevation of a cantilevered telescopic extendable gravity loader in its fully extended position into a truck trailer.

Referring now specifically to the drawings and the illustrative embodiments depicted therein, a cantilevered telescopic extendable gravity loader 10 includes a base structure 12 and one or more extendable conveyor units 14, which are extendable and retractable relative to one another and base 12 (FIGS. 1–5). Base or support structure 12 may be mounted at a floor 11 of a warehouse, loading dock or the like, where a truck trailer 16 may be positioned for loading packages and the like therein. The extendable units 14 are extendable outwardly from base 12 and into truck trailer 16 for loading the packages at the loading dock into the truck trailer 16. The extendable units 14 are cantileverly supported by the next inwardly or rearwardly positioned unit and the base structure and are nested within one another, such that the units may be fully retracted into base structure 12 to a stored position (FIG. 3) which minimizes interference with the floor space of the loading dock when loader 10 is not in use. In the illustrated embodiment, extendable conveyor units 14 of loader 10 includes an inwardly or rearwardly positioned unit 28, a middle unit 30, and an outwardly or forwardly positioned unit 22. A user interface section 20, which is preferably vertically adjustable to provide the packages at a height that is desirable to the user, is provided outward of unit 22. As used herein, unless otherwise noted, the terms outwardly and forwardly are used to describe the direction which the extendable units or sections 14 extend from the base structure 12, while the terms inwardly and rearwardly are used to describe the direction of travel of the extendable units 14 as they are retracted toward the base structure. These terms are intended to be illustrative and not limiting.

Each extendable unit 28, 30 and 22 includes opposite sidewalls 24 extending therealong. The units and sidewalls are formed to allow nested extension and retraction of each unit relative to the other units and the base support 12. Base structure 12 and extendable units 14 include a plurality of rollers 18 rotatably positioned therealong and between opposite sides 24 of the units. The rollers 18 rotate or roll to allow packages to travel down along extendable loader 10. Preferably, rollers 18 are freely rotatable and extendable loader 10 is angled downwardly such that the packages travel along rollers 18 in response to gravitational forces. Preferably, the downward angle of loader 10 is between at least approximately 3° and at most approximately 5°, to allow gravity to assist in extending the conveyor and to cause the packages to roll therealong, while still providing clearance of obstacles 16a which may be positioned within truck trailer 16. The obstacles may be other packages or supports for non-cantilevered loaders or conveyors positioned along the floor of the trailer. The plurality of rollers 18 are preferably positioned at an inner sidewall 24b of the sides 24 of extendable units 14 and base structure 12 and below an upper surface 24c thereof. The raised sidewalls thus function to substantially preclude packages from falling off the sides of the loader as they roll down the rollers 18 and accumulate at an outer end of loader 10. Preferably, a user interface section 20 is provided at a forward end 22a of forward extendable unit 22. User interface section 20 includes a driven conveying surface 40 which preferably is a powered-roller belt conveying surface. However, other driven conveying surfaces could be used.

Each of the extendable units 14 is cantileverly supported at a next rearwardly positioned unit or at base structure 12 and extends and retracts with respect thereto via rolling engagement of a pair of support rollers and cantilever support rollers, as discussed below. Extendable loader 10 further includes an electrical cable or wiring 49 which provides power and control of a retraction system 32 and/or various electrical features of the user interface section 20, as discussed below. Wiring 49 may be routed along the extendable units 14 in a manner similar to that disclosed in commonly assigned U.S. Pat. No. 5,423,413, issued to Gilmore, the disclosure of which is hereby incorporated by reference, or may be routed in any other known manner to maintain the electrical cable generally taut as loader 10 is extended and retracted, without affecting the scope of the present invention.

Figure 4:
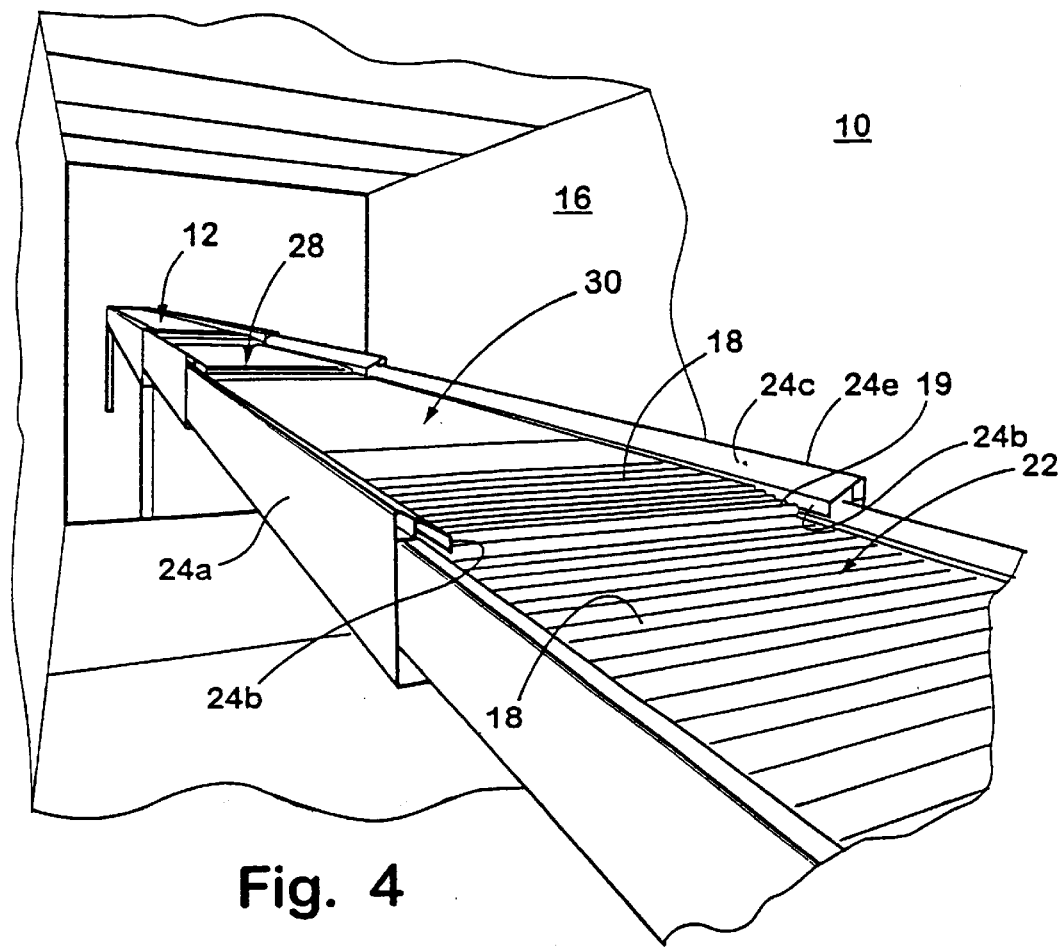
FIG. 4 is a perspective view of the roller conveyor of FIG. 1, as viewed from inside the trailer being loaded.
Figure 5:
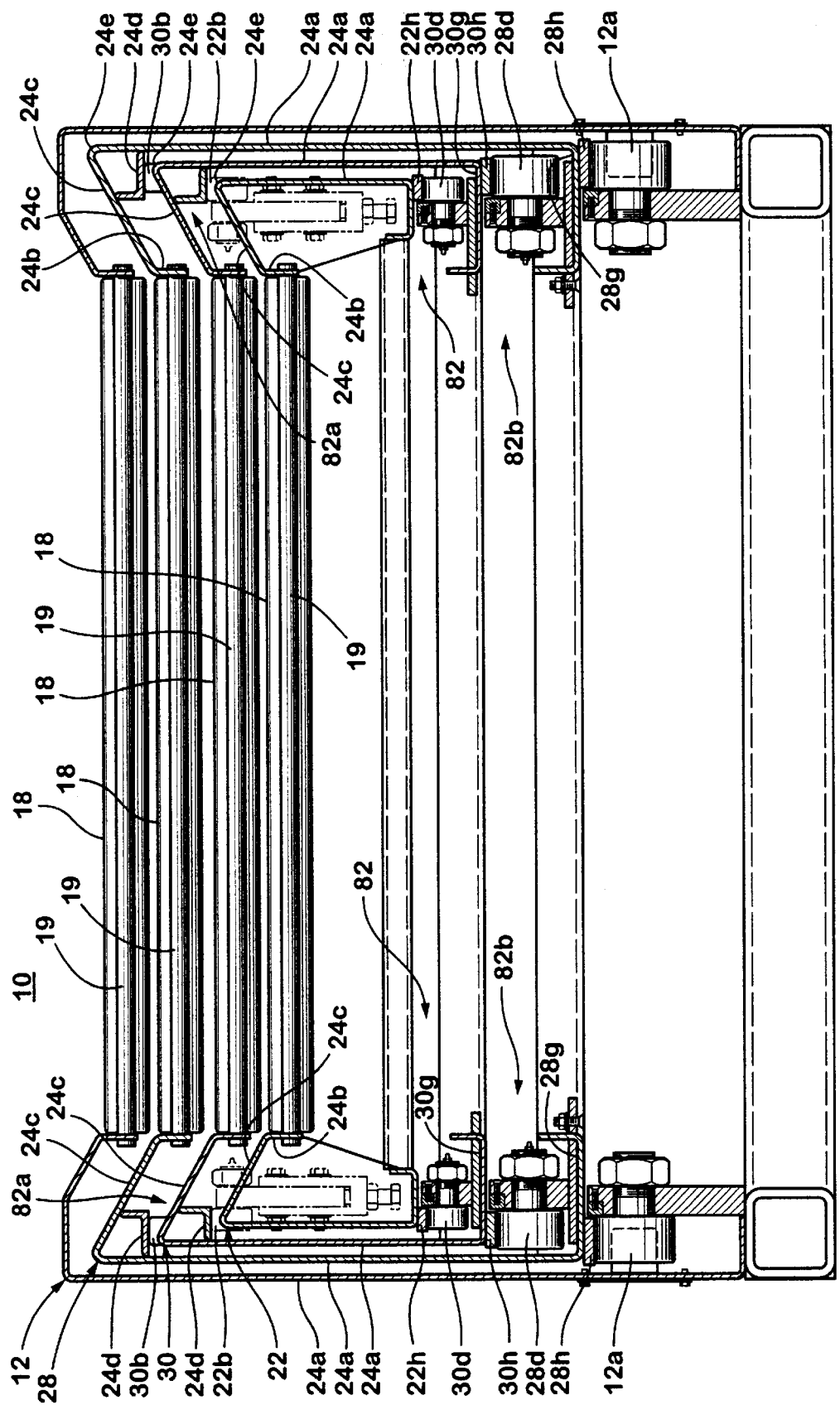
FIG. 5 is a sectional view taken along the lines V—V in FIG. 3.

As best shown in FIGS. 4 and 5, the pair of opposite sidewalls 24 of each extendable unit 14 comprise an outer sidewall 24a, inner sidewall 24b, and upper surface 24c. Upper surface 24c forms a raised wall to prevent packages from falling off of extendable loader 10 and preferably slants laterally inwardly and downwardly toward inner side 24b. Rollers 18 are rotatably mounted at and between the opposite inner sidewalls 24b, such that an upper surface of the rollers is positioned substantially below an upper edge 24e of upper surface 24c. Because the rollers are mounted below the upper portion of the sidewalls, the present invention allows for maximum strength of the sidewalls 24 of the extendable units 14 with a minimum overall height of the booms, while still allowing for each extendable unit to nest within the rearwardly positioned units. This provides improved structural rigidity of the units without requiring additional height thereof. This is because the beam strength of each section is determined by the height of the sidewall. By dropping the rollers below the upper extent of the beam, the dimension between the roller and the lower extent of the beam is reduced which accommodates a greater drop without interfering with obstacles on the trailer floor. The present invention makes this possible because the construction of the sidewalls provides a portion raised above the roller level while accommodating cantilevered support for outward sections, such as by utilizing the principles disclosed in commonly assigned U.S. Pat. No. 5,351,809, the disclosure of which is hereby incorporated herein by reference.

Additionally, by mounting the rollers 18 at inner sidewall 24b and nesting the units as shown in FIGS. 4 and 5, a minimal transition drop is provided between the conveying surfaces of the nested extendable units 14. A plurality of smaller diameter transition rollers 19 are provided at an outer end of base unit 12 and extendable units 28 and 30 to provide smooth transition between the conveying surfaces of the extendable units 14 and the base 12.

Extendable loader 10 includes a rollable support system 82, which includes a rolling cantilevered support 82a, a rolling vertical support 82b and a lateral restraint 82c positioned at each extendable unit 28, 30 and 22, as discussed below. As shown in FIGS. 5 and 8A–8C, rolling cantilevered support 82a for extendable unit 22 includes a cantilever support roller 22b. Cantilever support roller 22b provides cantilevered support of extendable unit 22 relative to middle extendable unit 30 via rolling engagement of cantilever support roller 22b along a track or rail 24d, such as an angle iron or the like, which is secured along the upper surface 24c and/or outer wall 24a of side walls 24 of middle extendable unit 30. Cantilever support roller 22b is preferably mounted at a rearward end 22c of extendable unit 22 and extends at least slightly upwardly above upper edge 24e of sidewall 24 of extendable unit 22.

Rolling vertical support 82b provides vertical support of extendable unit 22 and preferably includes a lower, rearward support roller 22f and a forward support roller 30d rotatably mounted at a forward end 30a of middle extendable unit 30. Rearward support roller 22f preferably extends downwardly from rearward end 22c to provide rolling support along a lower surface or track 30g of middle unit 30 (FIGS. 5 and 7B) when forward unit 22 is retracted within middle unit 30 and no longer cantileverly supported at middle unit 30, as discussed below. Forward support rollers 30d provide for rolling support of forward extendable unit 22 as forward unit 22 extends and retracts relative to middle extendable unit 30. Preferably, forward support rollers 30d rollingly engage a track or plate 22h along a lower, inwardly turned edge of the sidewalls 24 of forward unit 22, as shown in FIG. 5.

Cantilever support 82a and vertical support 82b are also provided for middle extendable unit 30, similar to forward extendable unit 22. Preferably, cantilever support 82a includes a pair of cantilever support rollers 30b rotatably mounted at upper edge 24e of sidewall 24 at a rearward end 30c of middle unit 30. Cantilever support rollers 30b provide cantilevered support of middle unit 30 via rolling engagement with track 24d along the upper edge of sidewall 24 of rearward extendable unit 28. Rolling vertical support 82b of middle extendable unit 30 preferably includes a lower, rearward roller 30f provided at rearward end 30c. Rearward roller 30f extends downwardly from rearward end 30c to engage a lower surface or track 28g (FIGS. 6B and 6C) at a lower region of sidewalls 24, in order to provide vertical support of the rearward end 30c as middle unit 30 is retracted into rearward unit 28 and no longer cantileverly supported at rearward unit 28. Rolling vertical support 82b for middle extendable unit 30 preferably further includes a forward support roller 28d rotatably mounted at a forward end 28a of rearward unit 28. Preferably, forward support roller 28d vertically supports middle extendable unit 30 via rolling engagement with a lower, laterally inwardly turned edge, track or strip 30h of the sidewalls of middle unit 30, as middle extendable unit 30 is extended and retracted relative to extendable unit 28.

Similarly, rollable support system 82 provides rolling vertical support 82b and cantilevered support 82a for rearward extendable unit 28 relative to base structure 12. Rolling vertical support 82b preferably includes support rollers 12a (FIG. 5) at a forward end of base structure 12, which rollingly engage a lower track or strip 28h along rearward extendable unit 28, and lower support rollers 28b. Cantilever support 82a preferably provides cantilevered support of rearward unit 28 via lower support rollers 28b (FIGS. 1, 6A and 6B). Lower support rollers 28b extend downwardly from a rearward end 28c and rollingly engage an upper or lower portion of a track 12b (FIG. 1) extending along a lower portion of each side of base support 12.

Roller support system 82 further includes lateral restraint 82c, which substantially limit metal-on-metal contact as the extendable units extend and retract relative to one another. Lateral restraint 82c preferably includes side rollers 22i, 28i and 30i, which extend laterally outwardly from a rearward end of outer sidewalls 24a of the respective conveyor unit 22, 28 and 30. As best shown in FIGS. 6C and 8C, side rollers 22i, 28i and 30i are rotatably mounted to a generally vertical pin 22j, 28j and 30j, respectively, which is secured within the sidewalls 24a to a respective roller mounting bracket 22k, 28k and 30k. The roller mounting bracket 22k, 28k and 30k is positioned within the sidewalls of the respective extendable unit and at a lower region thereof. The lateral restraint 82c provides rolling engagement of the side rollers with an inner surface of the sidewalls of the next rearwardly positioned extendable unit.

Accordingly, each extendable unit is rollingly supported by cantilever supports 82a, roller supports 82b and lateral restraints 82c of roller system 82 rollingly engaging corresponding tracks or rails or the like along the adjacent units. More particularly, forward unit 22 is rollingly supported at middle unit 30 by the pair of support rollers 30d of middle unit 30 and cantilever support roller 22b or lower support rollers 22f of forward unit 22. When forward unit 22 is extended far enough out from middle unit 30, such that a majority of the weight of forward unit 22 and any packages thereon is positioned forwardly from the pair of support rollers 30d at middle unit 30, cantilever support rollers 22b rollingly engage track 24d in middle unit 30. On the other hand, when a majority of the weight is positioned rearwardly of support rollers 30d, lower rollers 22f rollingly support rearward end 22c of forward unit 22 along lower track 30g of middle unit 30. Similar to forward unit 22, when middle unit 30 is extended far enough out from rearward unit 28, such that a majority of the weight of middle unit 30, forward unit 22 and any packages thereon is positioned forwardly of support rollers 28d, cantilever support rollers 30b rollingly engage upper track 24d of rearward unit 28 to cantileverly support middle unit 30 relative to rearward unit 28. On the other hand, when a majority of the weight is positioned rearwardly of support rollers 28d, lower roller 30f rollingly engages lower track 28g of rearward unit 28 to support rearward end 30c of middle unit 30. When the extendable units are substantially extended from base structure 12, cantilever support roller 28b of rearward unit 28 may rollingly engage an upper track portion of track 12b, while engaging a lower track portion of track 12b when the units are retracted into base structure 12 such that a majority of the weight is positioned rearwardly of support rollers 12a.

Figure 2:
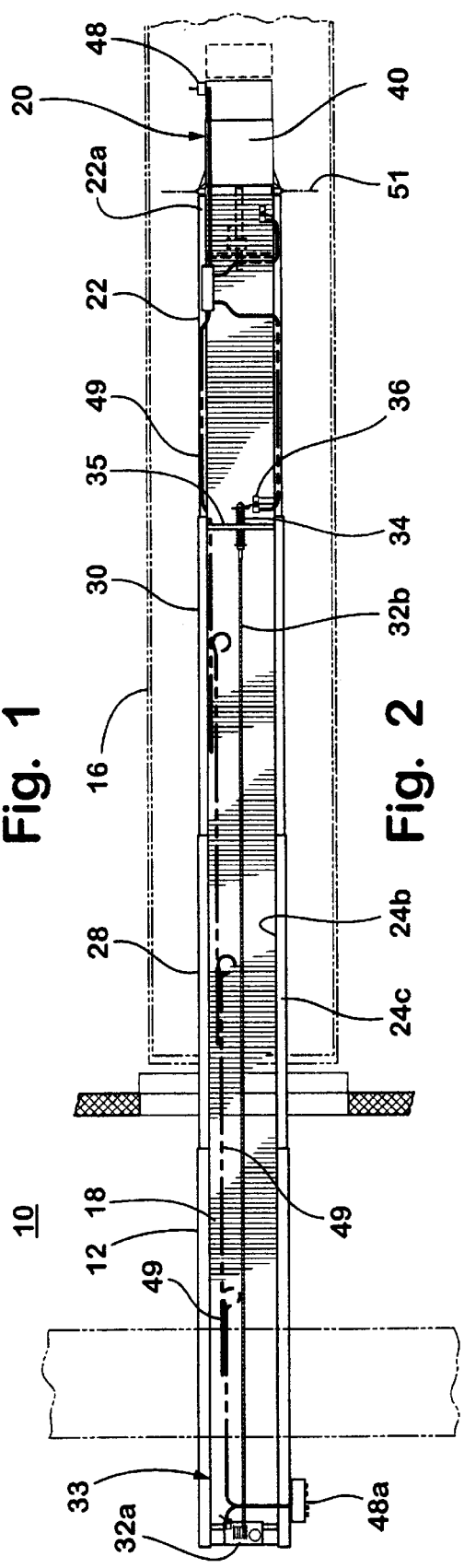
FIG. 2 is a top plan view of the extended loader of FIG. 1.
Figure 3:
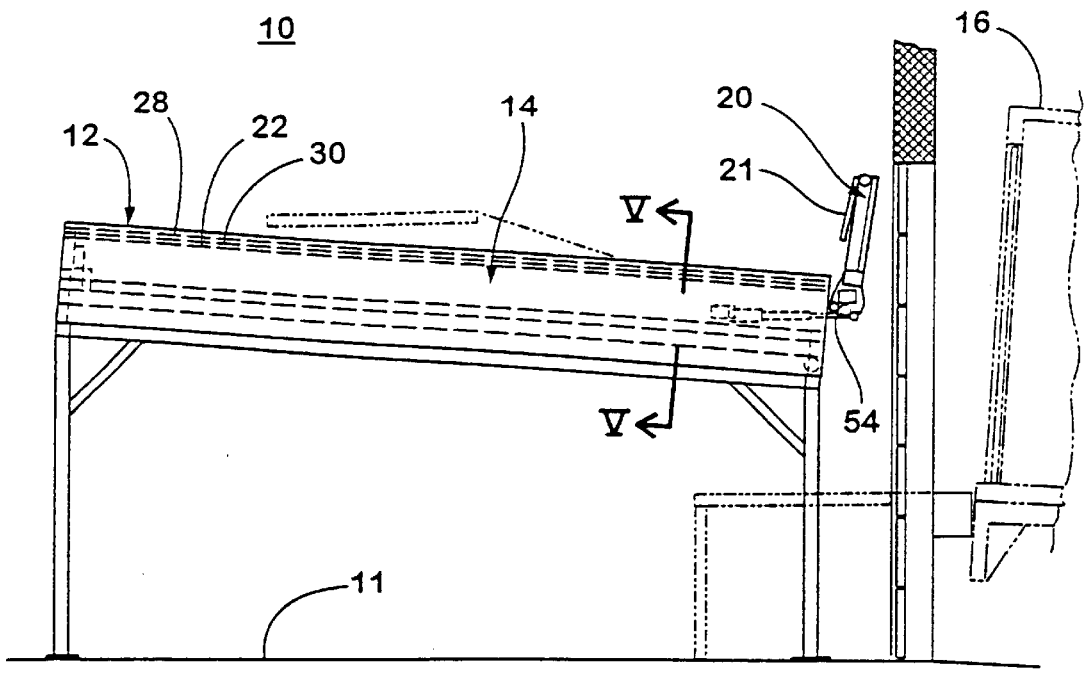
FIG. 3 is a side elevation similar to FIG. 1, with the loader in its fully retracted, stored position.

Preferably, extendable units 14 are extendable relative to each other and to base structure 12 by an extension system 33 that is powered in only one direction. Extension system 33 is extendable via gravitational forces and retractable via a retraction system 32, which preferably comprises a winch 32a and an elongated member 32b (FIGS. 1 and 2), which may be a cable, chain or any other member which is extendable and retractable as discussed below. Extension via gravitational forces is preferably controlled via frictional tuning of the roller supports of each extendable unit, as discussed below. Most preferably, winch 32a is positioned at base structure 12 and connected to cable 32b, which is extendable and retractable via operation of winch 32a. An end 32c of cable 32b opposite winch 32a is connected to forward extendable unit 22, such that extension or payout of cable 32b allows gravity to move forward extendable unit 22, and thus the other extendable units 28 and 30, forwardly from base support 12, while retraction of cable 32b pulls forward extendable unit 22, and thus the other extendable units 28 and 30, rearwardly toward and into base structure 12. Extension of cable 32b preferably is accomplished via winch 32a being released to allow unwinding or payout of cable 32b from winch 32a in response to a force, such as a force exerted by downward movement of the extendable units due to gravity and the angle or slope of the units, pulling at cable 32b. Preferably, forward end 32c of cable 32b is mounted to a spring 34 or the like positioned at or near cross member 35 toward rearward end 22c of forward extendable unit 22 (FIGS. 1, 2 and 8A). Preferably, limit switch 36 is positioned at spring 34 to detect an amount of compression and/or extension of spring 34 as cable 32b is extended and retracted via operation of winch 32a. If spring 34 extends beyond a threshold amount, which may correspond to slack in cable 32b, which typically indicates that the cable 32b is being paid out by winch 32a at too high a rate, limit switch 36 is operable to deactivate the winch or apply a brake (not shown) at winch 32a, in order to allow the extendable units to extend further and catch up to the cable via gravitational forces. Additionally, when the extendable units are being retracted by winch 32a, limit switch 36 may be operable to detect an excessive amount of compression in spring 34, and deactivate winch 32a in response thereto. Excessive compression of spring 34 may indicate that winch 32a is retracting cable 32b, but retraction of the extendable units is being restricted for some reason, such as an item being lodged between the extendable units or the like. Although shown with the spring being mounted forwardly of the cross member, clearly the spring may be otherwise or also mounted rearwardly of the cross member, such that the spring may be extended when retraction of the extendable units is restricted, without affecting the scope of the present invention.

In order to further control the extension of extendable units 14 from base 12 and from one another, the present invention preferably further provides frictional tuning between the support rollers 12a, 28d and 30d and the tracks or strips 28h, 30h and 22h of the corresponding units, to control the rate at which each individual unit extends from the next rearwardly positioned unit. Preferably, the rolling friction of the rollers is selected such that forward unit 22 extends from middle unit 30 at a slower rate than the rate that middle unit 30 extends from rearward unit 28 and that rearward unit 28 extends from base 12. Preferably, support roller 12a of base 12 is a steel roller, while support rollers 28d and 30d are urethane rollers, since the urethane rollers have a higher rolling friction associated therewith, thereby slowing down or resisting extension of the forwardly positioned units relative to the rate of extension of the rearward unit with respect to base 12. This allows the rearward extendable unit 28 to be the first unit to at least partially extend its conveying surface, while the forward units are delayed from extending from inner unit 28. This substantially precludes forward unit 22 from being the first to extend from base 12, which would result in a significant drop off between the conveying surface of base 12 to the conveying surface of forward unit 22. By tuning the rollers such that the rearwardly positioned units at least partially extend before the next forwardly positioned units, the present invention provides a substantially smooth transition between the conveying surfaces of extendable units 14 and base 12. The cantilever support rollers 22b, 30b and 28b and/or lower support rollers 22f, 30f and 28b may also be tuned or selected to similarly adjust the rate of extension of the units relative to one another and the base.

Figure 11:
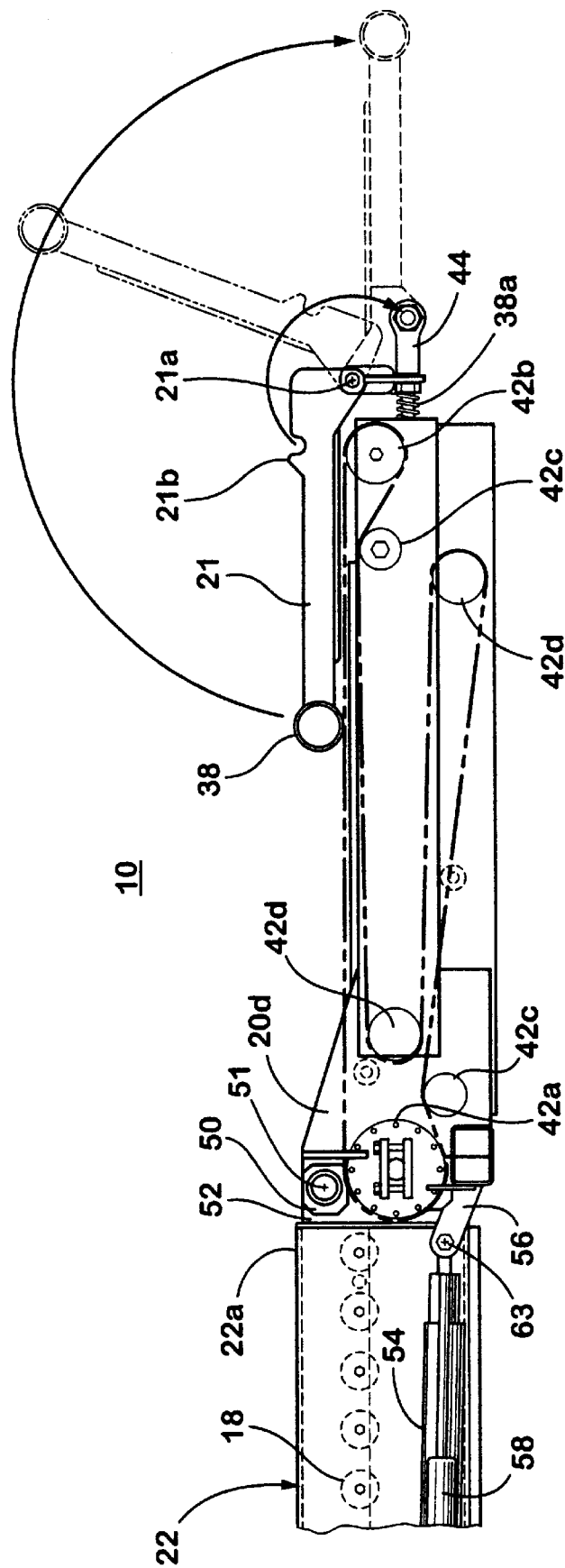
FIG. 11 is a side elevation similar to FIG. 9, with the user interface section retracted.

Preferably, retraction system 32 is operable via actuation of a control panel or the like at an outer end of extendable loader 10, such as a control panel 48 at a forward end 20a of user interface section 20. More preferably, retraction system 32 is operable via a movable bar or push/pull member 38 positioned at forward end 20a of user interface section 20 (FIGS. 9–11). The push/pull bar 38 is mounted at the forward end 20a of user interface section 20 via compression springs 38a, 38b or the like, which are extendable and compressible in response to movement of the bar 38 relative to the user interface section 20. One or more limit switches 39 are provided at user interface section 20 to detect forward and rearward movement of bar 38 to automatically activate or deactivate winch 32a and/or apply a brake to winch 32a in response to such detection. For example, if limit switch 39 detects rearward or inward movement of bar 38, such as by an operator pushing against the bar, limit switch 39 may trigger winch 32a to begin winding up or retracting cable 32b to retract the extendable units 14. Alternately, if rearward movement of bar 38 occurs while the extendable units are being extended, the limit switch may function to deactivate winch 32a or apply a brake to winch 32a in order to quickly prevent further payout of cable 32b therefrom and thus prevent further extension of the extendable units. Similarly, if limit switch 39 detects forward movement of bar 38, such as by a user pulling at bar 38, limit switch 39 functions to activate winch 32a or release the brake to payout cable 32b to allow additional extension of extendable units 14 from base 12. Although shown as being implemented on gravity loader 10, it is envisioned that the winch/cable retraction system of the present invention may be implemented on other conveyors, such as conventional loaders or the like, which may extend in response to gravitational forces or even manual pulling of the extendable units.

Referring now to FIGS. 9–11, user interface section 20 is preferably pivotally mounted at forward end 22a of forward extendable unit 22. As shown in FIG. 8A, forward or outer end 22a of forward extendable unit 22 preferably includes mounting brackets 52 or the like for pivotally supporting user interface section 20. Additionally, forward unit 22 may include an actuator mounting bracket 23 and may further include one or more assist device mounting brackets 60 for mounting an actuator 54 and/or assist device 58 (FIGS. 9 and 10) within forward unit 22, as discussed below. A limit switch 36 and spring 34 may be mounted at a cross member 35 toward rearward end 22c for connecting a cable 32b of a retraction system 32, as is also discussed below. User interface section 20 preferably comprises a two-stage extendable belt conveyor which includes an inner boom 20b and an outer extendable boom 20c. Outer boom 20c is extendable and retractable relative to inner boom 20b between a fully extended position, as shown in FIGS. 9 and 10, and a fully retracted position, as shown in FIG. 11. Outer boom 20c is slidable within inner boom 20b via manual pushing or pulling outer boom 20c.

User interface section 20 includes a continuous conveyor belt 40 which is reeved about a powered roller 42a, an outer reversing roller 42b, a pair of guide rollers 42c and a pair of reversing rollers 42d, which form the belt in a generally S-shaped curve to allow extension and retraction of outer boom 20c relative to inner boom 20a, while still maintaining endless conveyor belt 40 substantially taut, as is known in the art of belt conveyors. Powered roller 42a is operable to rotate to drive endless conveyor belt 40 around the rollers 42b, 42c and 42d to convey packages along an upper portion of user interface section 20.

Preferably, user interface section 20 includes a package rest 21 at outer end 20a for packages to rest on before they are lifted and loaded by an operator within the trailer being loaded. Preferably, package rest 21 is pivotally mounted at outer end 20a of outer boom 20c, such that the package rest may pivot between an in-use position, as shown in FIG. 9, and a stowed position, as shown in FIG. 11. Optionally, package rest 21 may be linked to extendable unit 22 or otherwise adjustable to maintain a generally horizontal orientation of package rest 21 throughout at least a partial range of vertical adjustment of user interface section, as shown in phantom in FIG. 1. Preferably, push/pull bar 38 is positioned at an outer end of package rest 21, and package rest 21 and bar 38 are movably mounted at a pair of mounting extensions 44 extending outwardly from outer end 20a of outer boom 20c. The mounting extensions 44 further include the compression springs 38a and 38b, such that movement of bar 38 may be detected by limit switch 39 at outer boom 20c, as discussed above. As best shown in FIG. 11, package rest 21 is pivotable about an axis 21a such that a lower notch or tab 21b pivots downward into engagement with mounting extension 44. Once engaged with mounting extension 44, package rest 21 is in an operable position, whereby forward and/or rearward movement of bar 38 and package rest 21 causes a corresponding movement of mounting extension 44 and springs 38a, 38b. As discussed above, such movement may activate or deactivate the retraction system of the extendable loader.

Preferably, user interface section 20 further includes one or more package sensors 46, such as photo eyes or optical sensors or the like, which are operable to detect a package at outer end 20a of user interface section 20. If a package is detected at that location for a prolonged period of time, user interface section 20 is operable to deactivate power roller 42a, in order to stop movement of belt 40, and thus prevent additional packages from piling up at the outer end of the user interface section. Control panel 48 is preferably provided at the outer end of outer boom 20c, in order to allow an operator to control extendable loader 10 from the outer end 20a of user interface section 20. Preferably, control panel 48 is operable to raise, lower, extend, and/or retract user interface section 20 with respect to outer extendable unit 22 of extendable loader 10. Control panel 48 is connected to electrical cable or wiring harness 49, which interconnects control panel 48 with winch 32a, switches 36, 39 and/or 70 (discussed below), sensors 46, actuator 54, and/or powered roller 42a and/or any other electrical motors or devices associated with the loader and/or the user interface section. Power and/or control of the electrical devices is thus provided via wiring 49 and one or more control panels, such as control panel 48 at user interface section 20 and/or a base control panel 48a at base structure 12.

Retraction and extension of outer boom 20c relative to inner boom 20b is preferably assisted by one or more gas springs 74. An inner end 74a of gas spring 74 is mounted at an inner end 20d of inner boom 20b and an outer, extendable end 74b of gas spring 74 is mounted at outer end 20a of outer boom 20c. Gas springs are known in the automotive arts and are operable to exert an inward or outward force in response to pressurized fluid within the gas springs. The gas springs comprise a cylinder and piston assembly with pressurized fluid in chambers at opposite ends of the device. As is known, the fluid passes between the two chambers of the gas spring through an orifice to allow extension and retraction of the gas spring. The gas spring 74 may be locked or retained in any position via actuation of a locking pin 78 or the like, which prevents fluid transfer between the chambers of the gas spring and thus prevents extension/retraction of the gas spring. Preferably, a handle 76 and cable 75 are operable to release locking pin 78 to allow for manual extension and retraction of outer boom 20c relative to inner boom 20b, with assistance from gas spring 74. Locking pin 78 is biased in its locked position such that when handle 76 is released, locking pin 78 locks gas spring 74 and substantially precludes rearward or forward movement of outer boom 20c relative to inner boom 20b.

Inner boom 20b of user interface section 20 includes a pair of mounting arms 50 at an inner end 20d thereof, which are pivotally received within the pair of corresponding mounting brackets 52 at forward end 22a of forward extendable unit 22. User interface section 20 is thus pivotally mounted to forward extendable unit 22 and pivotable about horizontal axis 51, and is preferably vertically adjustable via a linear actuator 54 mounted within forward extendable unit 22. Actuator 54 is preferably pivotally mounted at a rearward end 54a to mounting bracket 23 within forward extendable unit 22. An outer or forward extendable rod end 54b of actuator 54 is pivotally mounted at a lift-arm 56, which extends rearwardly from a lower portion of inner end 20d of inner boom 20b of user interface section 20. Preferably, actuator 54 is a conventional linear actuator, which is motorized to turn a ball and screw at one end to extend and retract the rod 54b connected to the lift arm 56 of the user interface section 20. Clearly, however, other actuating means may be implemented without affecting the scope of the present invention.

As actuator 54 extends, the actuator pushes outwardly or forwardly against lift arm 56, and causes upward lifting of user interface section 20 such that the user interface section pivots about the substantially horizontal axis 51. Because actuator 54 is positioned within forward extendable unit 22 and preferably pushes/pulls generally horizontally outwardly/inwardly to pivot user interface section 20, the actuator is operable in a generally horizontal orientation within the side profiles of the extendable interface section throughout a full range of vertical adjustment of the user interface section.

Preferably, one or more lift assist devices 58 is pivotally mounted between mounting bracket 60 within forward extendable unit 22 and an additional lift arm 62 at a lower portion of inner end 20d of inner boom 20b. Lift arm 56 and arms 62 are laterally spaced apart and positioned at rearward end 20d of user interface section 20, such that they are substantially aligned with one another, such that they define a single, generally horizontal axis 63 therethrough, as best seen in FIGS. 9 and 10. Preferably, lift assist devices 58 comprise gas springs, such as those discussed above with respect to gas springs 74, and as implemented in various automotive applications, such as tailgate applications and the like. The gas springs 58 are pressurized such that they exert a force at lift arms 62 to assist actuator 54 in raising user interface section 20 relative to outer extendable unit 22. The pressurized fluid in the springs is operable to exert a generally forward force to extend the rod from the cylinder and thus assist in raising the user interface section, while also exerting an opposite force to resist retraction of the rod into the cylinder and lowering of the user interface section. Gas springs 58 assist lifting or pivoting of user interface section 20 by actuator 54 and further function as a dampening device to absorb shock of the user interface section, thereby protecting the actuator. The actuator thus can move the user interface section up and down with aid from the gas springs, such that the actuator only handles the live load, such as the package weight and the like, at user interface section 20, while the weight of the section itself may be substantially supported by the gas springs. Accordingly, the present invention does not require as large a lift or moment arm 56 at the end of the actuator and user interface section to cause upward pivoting of the section. This allows a substantially lower vertical size or height of the user interface section over interface booms or sections of the prior art.

Preferably, actuator 54 is mounted within extendable conveyor unit 22 at mounting bracket 23 via one or more elastic or compressible and extendable members, such as a pair of compression springs 68a and 68b. Compression springs 68a, 68b function to further absorb any shock at the actuator from a package or the like being dropped on user interface section 20. Preferably, one or more limit switches 70 are positioned along compression springs 68a, 68b to detect an amount of compression or extension of the spring or springs. If either spring is compressed beyond a threshold level, limit switch 70 is operable to open or close a circuit to deactivate actuator 54. Actuator 54 thus may be deactivated if resistance is encountered to an upward or downward movement of user interface section 20. More particularly, if actuator 54 is extending to raise user interface section 20, and resistance is encountered to the upward movement of the interface section, actuator 54 will continue to push against lift arm 56 and cause compression of a forward spring 68a, since rearward end 54a of actuator 54 will tend to move rearwardly as resistance to forward movement of rod 54b is encountered. When the compression of forward spring 68a reaches a threshold amount, limit switch 70 is operable to deactivate actuator 54 and prevent further extension of the actuator. Similarly, if actuator 54 is pulling at lift arm 56 to lower user interface section 20 and resistance is encountered to the downward movement of the interface section, actuator 54 will continue to pull at the lift arm and cause compression of a rearward spring 68b, since rearward end 54a of actuator 54 will tend to be pulled forwardly as resistance to rearward movement of rod 54b is encountered. Limit switch 70 again detects the forward movement of actuator 54 relative to forward extendable unit 22 and functions to deactivate the actuator when the forward travel or compression reaches a threshold amount. The compression springs thus function to absorb shock and protect the actuator 54 when resistance is encountered during vertical adjustment of the user interface section. Additionally, limit switch 70 functions to deactivate actuator 54 in response to such resistance being encountered, thereby further protecting the actuator from damage.

Figure 12:
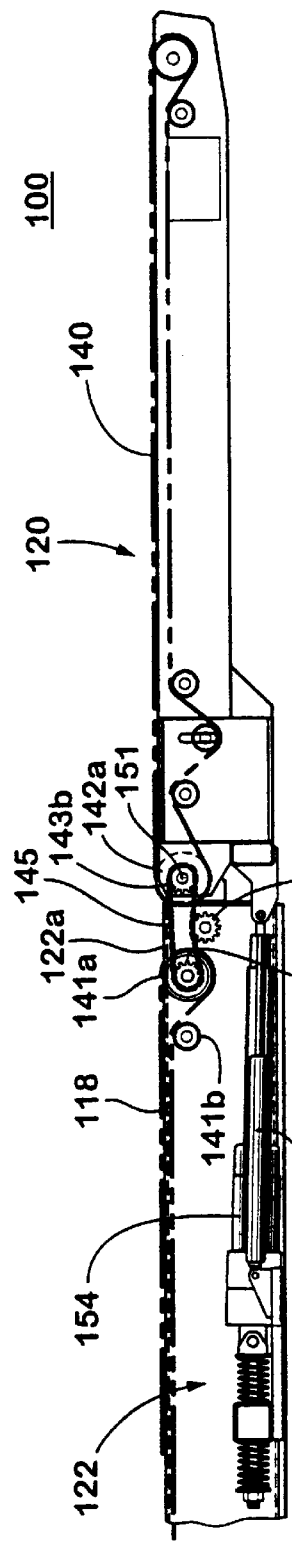
FIG. 12 is a side elevation similar to FIG. 9, with a single stage user interface section positioned at a forward end of a belt conveyor section.
Figure 13:
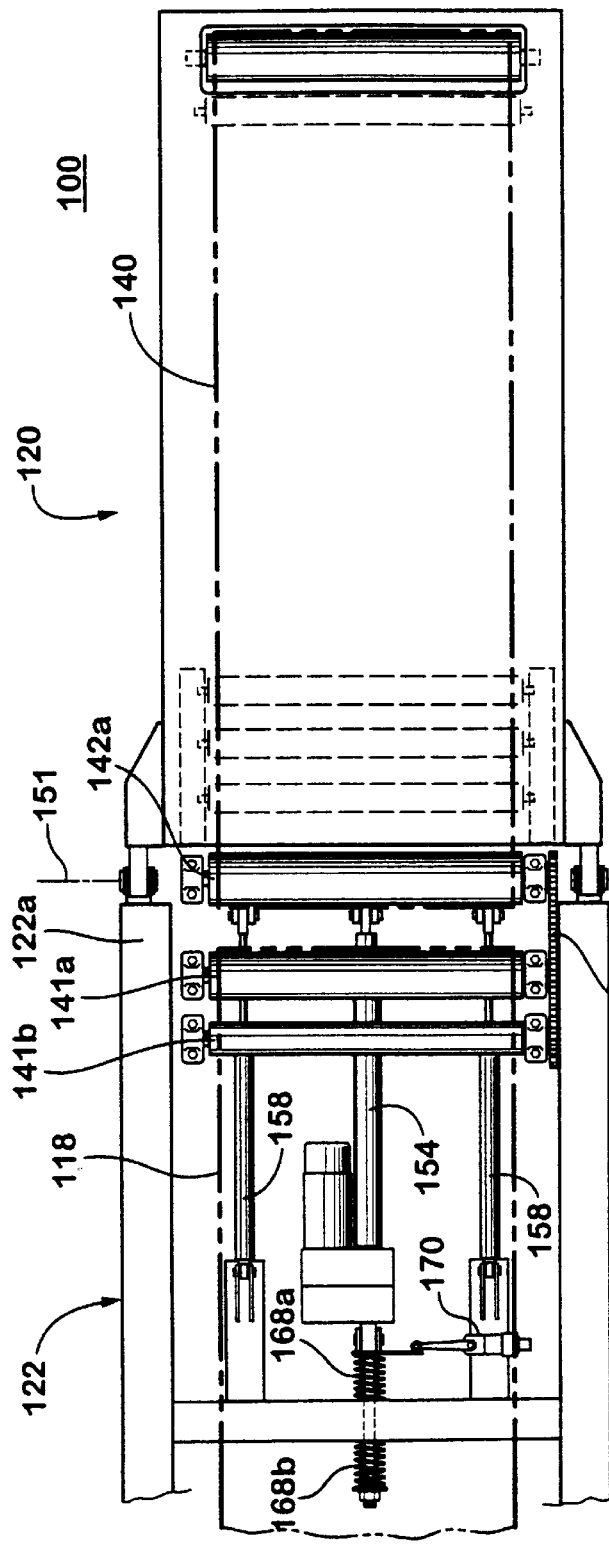
FIG. 13 is a top plan view of the user interface section of FIG. 12.
Figure 14:
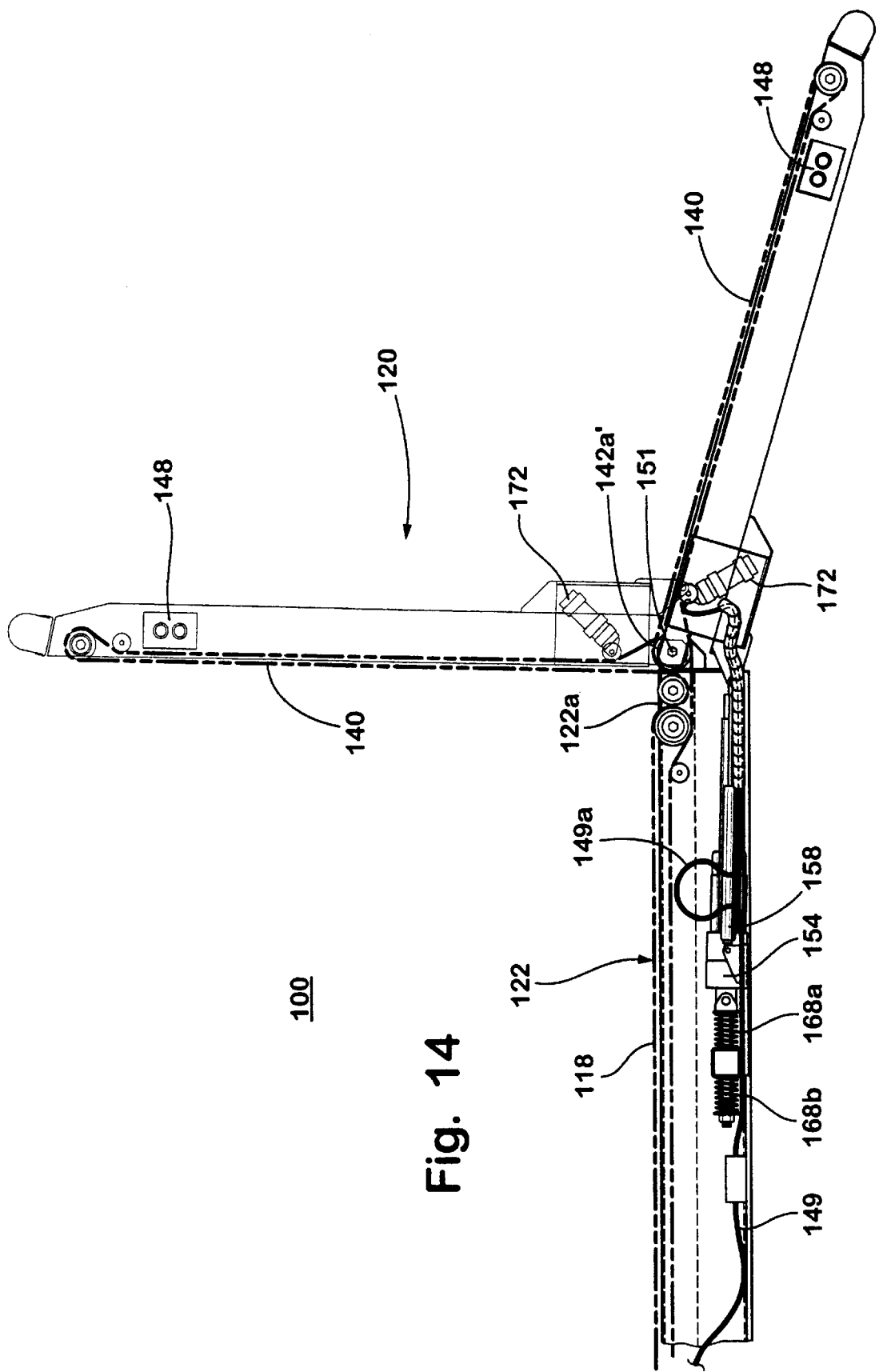
FIG. 14 is a side elevation similar to FIG. 13, of the user interface section with powered belt roller.

Although the assist devices or gas springs 58 and the compression springs 68a and 68b are shown in FIGS. 9–11 as being implemented at an extendable belt conveyor user interface section 20, clearly these devices are equally applicable to other vertically adjustable boom sections at both roller conveyors and belt conveyors, without affecting the scope of the present invention. For example, as shown in FIGS. 12–14, a user interface section 120 may comprise a single stage belt conveyor boom section, which is vertically adjustable with respect to an extendable conveyor section 122 of a conveyor 100. The mounting and vertical adjustment of user interface section 120 at conveyor section 122 is substantially similar to user interface section 20 at extendable unit 22, such that a detailed discussion will not be repeated. Suffice it to say that interface section 120 is pivotable about a horizontal axis 151 at a forward end 122a of conveyor section 122. An actuator 154 and lift assist devices 158 are operable to vertically adjust user interface section 120 via pivotable movement about axis 151. Actuator 154 is mounted within conveyor section 122 at one or more compression springs 168a, 168b. A limit switch 170 may be included in conveyor section 122 to detect compression and/or extension of springs 168a, 168b and may be operable to deactivate actuator 154 accordingly.

Belt conveyor section 122 of conveyor 100 comprises an endless conveyor belt 118 which is reversed and guided around rollers 141a and 141b at outer end 122a of conveyor section 122. The extendable conveyor section 122 may be part of a conventional belt or roller conveyor, or may be a belt roller of the types disclosed in commonly assigned U.S. Pat. Nos. 5,351,809, issued to Gilmore et al., and 5,423,413 issued to Gilmore, or U.S. patent application Ser. No. 09/474,700, filed Dec. 29, 1999 for EXTENDABLE CONVEYOR WITH ADDITIONAL BOOM SECTION, the disclosures of which are hereby incorporated herein by reference.

User interface section 120 may be a powered belt conveyor, similar to user interface section 20 discussed above, or may be driven by conveyor section 122, as shown in FIGS. 12 and 13. Outer roller 141a of conveyor section 122 may include a gear member 143a, while an inner roller 142a of user interface section 120 includes a second gear member 143b. A chain or drive linkage 145 is routed around gear members 143a and 143b such that rotation of roller 141a by belt 118 drives rotation of roller 142a via gear members 143a and 143b and drive linkage 145, which further drives a continuous belt 140 of user interface section 120. A center gear member 143c is included at conveyor section 122 to maintain proper tension in drive linkage 145.

User interface section 120 is vertically adjustable with respect to extendable belt conveyor 122 via actuator 154 and gas springs 158, similar to user interface section 20 at forward extendable section 22 of extendable loader 10, discussed above. As shown in FIG. 14, an electrical cable or wire 149 extends along an interior of extendable conveyor 122 and into user interface section 120, in order to provide power to user interface section 120 and to connect a control panel 148 to an extension and retraction mechanism (not shown) of extendable conveyor 122. User interface section 120 may include a powered belt roller 142a' (FIG. 14), lights 172 and/or other electrical components which are interconnected to wiring 149 and controllable via control panel 148. The electrical cable 149 is of a selected length, such that when user interface section 120 is lowered, as shown in FIG. 14, a loop 149a is formed in cable 149 within extendable conveyor 122. The loop 149a has a sufficient length of cable to accommodate upward movement of user interface section 120, which results in cable 149 being pulled from extendable conveyor 122 as a lower portion of user interface section 120 moves outwardly from the forward end 122a of extendable conveyor 122.

Therefore, the present invention provides an extendable and nestable gravity loader which is oriented at an appropriate downward angle for easy extension of the extendable units and easy travel of packages along the rollers thereof, while still providing sufficient clearance for obstacles which typically may be found along a lower surface or floor of a truck trailer or the like. The sidewalls of the extendable loader define package stops along the loader to prevent packages from be laterally discharged from the roller as they travel down and may accumulate toward an outer end of the loader. The sidewalls further provide for rotatably mounting the rollers of the loader at a level below an upper edge of the sidewalls, to allow enhanced structural rigidity of the extendable units, while requiring a minimal vertical height of the units over the prior art. Additionally, because the cantilevered support rollers are positioned at the upper edge of the sidewalls, the vertical height of the extendable units may be further reduced, since a downwardly extending cantilever support roller and corresponding upper and lower track surfaces at the next inward unit are not required. The present invention thus allows for extendable units which have a reduced height of their sidewalls, while also providing a minimum drop off between the conveying surfaces of each unit.

Furthermore, a user interface section may be pivotally mounted at a forward end of the loader and may be vertically adjusted such as via a linear actuator. While the gravity-motivated conveyor feeding the user interface section must be oriented at a sufficient slope to allow packages to move under the force of gravity, the user interface provides a convenient member to feed packages to the operator at a height that is convenient to the operator. The actuator may be mounted at the extendable conveyor unit via one or more compression springs, which function to absorb conveyor shock as packages or the like may impact the user interface section and further may protect the actuator when resistance is encountered to upward or downward movement of the user interface section. A limit switch may be provided to further protect the actuator by deactivating the actuator in response to a detection of such resistance. Additionally, a lift assist device may be implemented to assist the actuator in raising and lowering the user interface section, such that the lift arm or moment arm of the user interface section may be substantially reduced over the prior art, thereby providing a reduced vertical height of the user interface section.

Additionally, the present invention provides an efficient and inexpensive extension and retraction system that may be used for extending and retracting the extendable units of the extendable loader. A winch is operable to wind up or retract a cable, in order to retract the forwardmost extendable unit toward the base structure of the loader. The winch is also operable to allow the cable to be unwound or paid out as the extendable units extend forwardly due to gravitational forces. A limit switch is preferably provided which detects resistance to rearward movement of the extendable units and may detect when the units are extending forwardly at a rate which is above or below the rate of cable pay out by the winch. Preferably, the support rollers of the extendable units are selected such that the rolling friction varies, such that the rearward extendable units extend forwardly at a quicker pace than the forward extendable unit or units. By frictionally tuning the rollers, the present invention ensures a smooth transition between the conveying surfaces of the extendable units.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. An extendable conveyor comprising:
   a support structure;
   an extendable conveyor section supported in a cantilevered manner including at least one extendable conveyor unit that is mechanically extendable between an extended position and a retracted position nested within said support structure, said at least one extendable conveyor unit having an upper portion along opposite sides thereof; and
   a plurality of rollers rotatably supported at said at least one extendable conveyor unit, said plurality of rollers defining a gravity operated conveying surface; and
   a user interface section at a forward end of said extendable conveyor section, said user interface sections comprising a driven conveying surface.

2. The extendable conveyor of claim 1 wherein said plurality of rollers are supported below said upper portion of said at least one extendable conveyor unit.

3. The extendable conveyor of claim 2 wherein said at least one extendable conveyor unit and said conveying surface being oriented at an angle with respect to horizontal, the angle being between at least approximately three degrees and at most approximately five degrees with respect to horizontal.

4. The extendable conveyor of claim 3, wherein said at least one extendable conveyor unit comprises at least two extendable conveyor units and wherein at least one of said at least two extendable conveyor units is cantilevered supported along said upper portion of another of said at least two extendable conveyor units.

5. The extendable conveyor of claim 4, wherein said at least one of said at least two extendable conveyor units includes at least two cantilever support rollers which rollingly engage a lower surface of said upper portion of said opposite sides.

6. The extendable conveyor of claim 5, wherein said at least two cantilever support rollers rollingly engage a track along said lower surface of said upper portion.

7. The extendable conveyor of claim 3, wherein said opposite sides of said at least one extendable conveyor unit define an inverted generally U-shaped channel having an outer side, an inner side and said upper portion.

8. The extendable conveyor of claim 7, wherein said plurality of rollers are mounted to said inner side and extend therebetween.

9. The extendable conveyor of claim 8, wherein said at least one extendable conveyor unit comprises at least two extendable conveyor units and wherein at least one of said at least two extendable conveyor units includes a cantilever support roller which rollingly engages said upper portion of said opposite sides of another of said least two extendable conveyor units.

10. The extendable conveyor of claim 9, wherein said at least two cantilever support rollers rollingly engage a track along said upper portion.

11. The extendable conveyor of claim 1, wherein said extendable conveyor section is extendable from said support structure via gravitational forces.

12. The extendable conveyor of claim 11, wherein said at least one extendable conveyor unit comprises at least two extendable conveyor units and wherein said at least two extendable conveyor units include support rollers for rollingly supporting said extendable conveyor units during extension and retraction of said extendable conveyor units.

13. The extendable conveyor of claim 12, wherein said at least two extendable conveyor units comprise forward and rearward units, said forward unit being extendable forwardly from, said rearward unit, said rearward unit being extendable forwardly from said support structure, said rollers comprising first rollers on said forward unit and second rollers on said rearward unit.

14. The extendable conveyor of claim 13, wherein said first rollers have a first frictional resistance to rolling and said second rollers have a second frictional resistance to rolling, wherein said first frictional resistance is greater than said second frictional resistance such that said forward unit is extendable at a slower pace than said rearward unit.

15. The extendable conveyor of claim 11 further including a winch, wherein said winch is operable to retract said at least two extendable conveyor units.

16. The extendable conveyor of claim 1 wherein said driven conveying surface comprises a belt conveyor.

17. The extendable conveyor of claim 1, wherein said user interface section is vertically adjustable with respect to said forwardmost unit via a linear actuator.

18. The extendable conveyor of claim 17, wherein said forwardmost unit includes a vertical assist device which is operable to assist said linear actuator in vertically adjusting said user interface section.

19. The extendable conveyor of claim 18, wherein said vertical assist device comprises at least one gas spring.

20. The extendable conveyor of claim 17, wherein said linear actuator is mounted at said forwardmost unit at a biasing member, said biasing member being extendable or compressible in response to resistance to vertical movement of said user interface section during vertical adjustment thereof.

21. The extendable conveyor of claim 20, wherein said biasing member comprises at least one compression spring.

22. The extendable conveyor of claim 20 further including a limit switch at said biasing member, said actuator being deactuatable by said limit switch in response to a threshold amount of extension or compression of said biasing member.

23. The extendable conveyor in claim 1, wherein said user interface section comprises first and second booms, said first boom being mounted at said at least one extendable conveyor unit and said second boom being extendable and retractable with respect to said first boom.

24. The extendable conveyor in claim 23, wherein said user interface section includes at least one gas spring which is operable to assist in extension and retraction of said second boom with respect to said first boom.

25. The extendable conveyor in claim 24, wherein said gas spring is operable to limit extension and retraction of said second boom in response to a locking mechanism.

26. The extendable conveyor in claim 25, wherein said locking mechanism comprises a handle and locking pin, said handle being operable to release said locking member to allow extension and retraction of said second boom.

27. An extendable conveyor comprising:
a support structure; and
at least one mechanically extendable section which is extendable along a longitudinal axis between a fully retracted position and a fully extended position, said mechanically extendable section supported in a cantilever fashion by said support structure, said extendable section having inverted generally U-shaped opposite sides which include an outer sidewall, an inner sidewall and an upper portion, said mechanically extendable section having a plurality of rollers mounted to said inner sidewalls and below said upper portion, said plurality of rollers defining a conveying surface, said extendable section being nested within said support structure when fully retracted therein.

28. The extendable conveyor of claim 27, wherein said at least one extendable section comprises a forward section and a rearward section, said forward section being extendable from said rearward section and including a cantilever support roller at a rearward end of said forward section, said forward section being cantileverly supported at said rearward section via rolling engagement of said cantilever support roller along said upper portion of said sidewalls of said rearward section.

29. The extendable conveyor of claim 28, wherein said upper portion of said rearward section includes a track extending therealong, said cantilever support roller rollingly engaging said track.

30. The extendable conveyor of claim 28, wherein said forward section further includes a lower support roller extending downwardly from said rearward end and rollingly engaging a lower portion of said rearward section.

31. The extendable conveyor of claim 30, wherein said lower portion of said rearward section comprises a track which extends laterally inwardly along a lower portion of said outer sidewalls.

32. The extendable conveyor of claim 27, wherein each of said upper portion of said opposite sides slants downwardly and laterally inwardly from an upper edge of said outer sidewall to an upper edge of said inner sidewall.

33. The extendable conveyor of claim 27, wherein said plurality of rollers include a plurality of conveying rollers and a plurality of narrowed rollers positioned at a forward end of said extendable section, said narrowed rollers having a diameter which is less than a diameter of said conveying rollers.

34. An extendable conveyor comprising:
an extendable conveyor section supported in a cantilevered manner including at least two extendable conveyor units which are extendable between an outwardly extended position and a retracted position nested within said extendable conveyor section, said at least two extendable conveyor units defining a conveying surface, said at least two extendable conveyor units being downwardly angled and extendable to the extended position via gravitational forces, each of said extendable conveyor units including support rollers which rollingly engage a rearwardly positioned unit, said support rollers being frictionally tuned such that said extendable conveyor units extend forwardly at differing speeds such that extension of one extendable conveyor unit relative to another varies in response to the frictional resistance of said support roller.

35. The extendable conveyor of claim 34, wherein said at least two extendable conveyor units are downwardly angled at an angle which is between approximately three and five degrees from horizontal.

36. The extendable conveyor of claim 34, wherein said at least two extendable conveyor units comprise at least one rearward unit and a forward unit, said forward unit being extendable forwardly from said at least one rearward unit.

37. The extendable conveyor of claim 36, wherein said forward unit is extendable at a slower pace than said at least one rearward unit.

38. The extendable conveyor of claim 36, wherein said support rollers comprise first rollers on said forward unit and second rollers on said at least one rearward unit.

39. The extendable conveyor of claim 38, wherein said first rollers have a first frictional resistance to rolling and said second rollers have a second frictional resistance to rolling, said first frictional resistance being different than said second frictional resistance.

40. The extendable conveyor of claim 39, wherein said first frictional resistance is greater than said second frictional resistance such that said forward unit is extendable at a slower pace than said at least one rearward unit.

41. The extendable conveyor of claim 39, wherein said first rollers comprise urethane rollers and said second rollers comprise steel rollers.

42. The extendable conveyor of claim 34 further including a winch and an elongated member, said winch being operable to retract said at least two extendable conveyor units via retraction of said elongated member.

43. The extendable conveyor of claim 42, wherein said elongated member comprises one of a cable and a chain.

44. The extendable conveyor of claim 42, wherein extension of said at least two extendable conveyor units is further controlled via payout of said elongated member by said winch.

45. The extendable conveyor of claim 34, wherein said conveying surface comprises a plurality of rollers rotatably mounted along said at least two extendable conveyor units.

46. An extendable conveyor comprising:
   an extendable conveyor section supported in a cantilevered manner and including at least one extendable conveyor unit that is extendable forwardly between a forward, extended position and a rearward, retracted position nested within said extendable conveyor section;
   a user interface section supported in a cantilevered manner from said at least one extendable conveyor unit, wherein said user interface section is adjustable about an axis;
   a conveying surface having a first portion defined on said extendable conveyor section and a second portion defined on said user interface section; and
   an actuator which is operable to adjust said user interface section about said axis, a mounting end of said actuator being mounted at least one elastic member at said at least one extendable conveyor unit, said elastic member being extendable and compressible in response to force being placed on said user interface section.

47. The extendable conveyor of claim 46 further including a limit switch which is operable to deactivate said actuator in response to a threshold amount of extension or compression of said at least one elastic member.

48. The extendable conveyor of claim 47, wherein said at least one elastic member comprises a pair of compression springs.

49. The extendable conveyor of claim 48, wherein said limit switch is triggerable in response to one of said compression springs being compressed a threshold amount.

50. The extendable conveyor of claim 46, wherein said at least one elastic member comprises first and second compression springs, said first compression spring being positioned forwardly from said mounting end of said actuator and said second compression spring being positioned rearwardly from said mounting end.

51. The extendable conveyor of claim 50, wherein said first compression spring is compressible in response to resistance to downward movement of said user interface section and said second compression spring being compressible in response to resistance to upward movement of said user interface section.

52. The extendable conveyor of claim 51 further including a limit switch which is operable to deactivate said actuator in response to a threshold amount of extension or compression of at least one of said first and second compression springs.

53. The extendable conveyor of claim 46, wherein said first portion of said conveying surface comprises a plurality of rollers.

54. The extendable conveyor of claim 46, wherein said second portion of said conveying surface comprises a conveyor belt.

55. The extendable conveyor of claim 46, wherein said user interface section is vertically adjustable about a generally horizontal axis.

56. The extendable conveyor of claim 55, wherein said elastic member is extendable and compressible in response to resistance to vertical movement of said user interface section being encountered as said actuator vertically adjusts said user interface section.

57. An extendable conveyor comprising:
   an extendable conveyor section supported in a cantilevered manner including at least one extendable conveyor unit that is extendable between an extended position and a retracted position nested within said extendable conveyor section;
   a user interface section supported in a cantilevered manner from said at least one extendable conveyor unit, wherein said user interface section is vertically adjustable about a substantially horizontal axis;
   a conveying surface having a first portion defined on said extendable conveyor section and a second portion defined on said user interface section;
   an actuator which is operable to vertically adjust said user interface section; and
   a vertical assist device which is operable to assist said actuator in vertically adjusting said user interface section.

58. The extendable conveyor of claim 57, wherein said vertical assist device comprises at least one gas spring positioned along said actuator.

59. The extendable conveyor of claim 57, wherein said actuator comprises a linear actuator.

60. The extendable conveyor of claim 57, wherein said actuator is mounted at at least one compression spring which is compressible and extendable in response to resistance to vertical adjustment of said user interface section.

61. The extendable conveyor of claim 60, wherein said actuator is deactuatable in response to a detection of a threshold level of compression or extension of said at least one compression spring.

62. The extendable conveyor of claim 57, wherein said actuator and said vertical assist device are connectable to said user interface section at lift arms extending form a portion of said user interface section, said lift arms being positioned generally within a side profile of said user interface section.

63. The extendable conveyor of claim 62, wherein said actuator and said vertical assist device are operable in a generally horizontal orientation throughout a full range of vertical adjustment of said user interface section.

64. The extendable conveyor in claim 57 further including an operator control panel on said user interface section that operates said actuator.

65. The extendable conveyor in claim 57, wherein said extendable conveyor section includes a base unit, said at least one extendable conveyor unit being nestable nests in said base unit in a retracted position.

66. The extendable conveyor in claim 57, wherein said user interface section is supported from a forwardmost one of said plurality of extendable conveyor units.

67. The extendable conveyor in claim 57, wherein said user interface section is an extendable interface section.

68. The extendable conveyor in claim 67, wherein said user interface section includes at least one gas spring which is operable to assist in extension and retraction of said user interface section.

* * * * *